United States Patent [19]

Michiue

[11] Patent Number: 5,752,061
[45] Date of Patent: May 12, 1998

[54] ARRANGEMENT OF DATA PROCESSING SYSTEM HAVING PLURAL ARITHMETIC LOGIC CIRCUITS

[75] Inventor: Makoto Michiue, Tokyo, Japan

[73] Assignee: Matsushita Electric Industrial Co., Ltd., Osaka, Japan

[21] Appl. No.: 401,609

[22] Filed: Mar. 9, 1995

[30] Foreign Application Priority Data

Mar. 10, 1994 [JP] Japan .................. 6-040087

[51] Int. Cl.⁶ .................................. G06F 7/00
[52] U.S. Cl. .................. 395/800; 395/936; 395/934; 395/942; 364/710.14; 364/830; 364/DIG. 1
[58] Field of Search ................... 395/800, 942, 395/934, 936; 364/DIG. 1, 710.14, 830

[56] References Cited

U.S. PATENT DOCUMENTS

| | | | |
|---|---|---|---|
| 4,615,004 | 9/1986 | Chevillat et al. | 395/394 |
| 4,901,235 | 2/1990 | Vora et al. | 395/597 |
| 4,901,267 | 2/1990 | Birman et al. | 364/736 |
| 5,428,763 | 6/1995 | Lawyer | 395/800 |
| 5,465,374 | 11/1995 | Dinkjian et al. | 395/800 |
| 5,481,693 | 1/1996 | Blomgren et al. | 395/375 |
| 5,519,881 | 5/1996 | Yoshida et al. | 395/800 |
| 5,542,109 | 7/1996 | Blomgren et al. | 395/800 |

FOREIGN PATENT DOCUMENTS

| | | |
|---|---|---|
| 0483861 A3 | 5/1992 | European Pat. Off. . |
| 0547230 A1 | 6/1993 | European Pat. Off. . |
| WO92/01265 | 1/1992 | WIPO . |

OTHER PUBLICATIONS

Tomita et al., 13th Annual International Symposium on Computer Architecture, "A Computer With Low-Level Parallelism QA-2", Jun. 2, 1986–Jun. 5, 1986, pp. 280–289, Tokyo, Japan.

J.C. Froment et al., IBM Technical Disclosure Bulletin, "Timing Variations In A Mono Clocking Scheme", vol. 24, No. 7a, Dec. 1981, pp. 3514–3515, Armonk, U.S.

IBM Technical Disclosure Bulletin, "Selecting Precoded Instructions With A Surrogate", vol. 36, No. 6A, Jun. 1993, pp. 35–38.

*Primary Examiner*—Alyssa H. Bowler
*Assistant Examiner*—Dzung C. Nguyen
*Attorney, Agent, or Firm*—Lowe, Price, LeBlanc & Becker

[57] ABSTRACT

A data processing apparatus is provided which includes an instruction decoder, an input circuit, an input selecting circuit, a plurality of arithmetic logic circuits, an output selecting circuit, and an output circuit. The input circuit receives input data to provide a plurality of data signals. The input selecting circuit selects the data signals to distribute each of them to corresponding one of the arithmetic logic circuits according to a command from the instruction decoding circuit. The arithmetic logic circuits receive the data signals to perform arithmetic and logic operations and to provide operation output signals indicative of results of the arithmetic and logic operations. The output selecting circuit selects the operation output signals to distribute each of them to a given location of the output circuit. This architecture of the data processing apparatus allows a plurality of arithmetic and logic operations to be executed at high speed using the single input and output circuits.

7 Claims, 7 Drawing Sheets

ARRANGEMENT OF DATA PROCESSING SYSTEM HAVING PLURAL ARITHMETIC LOGIC CIRCUITS

BACKGROUND OF THE INVENTION

1. Technical Field

The present invention relates generally to a data processing system, and more particularly to improved architecture of a data processing system which is designed to perform a plurality of arithmetic and logic operations simultaneously or sequentially at high speed.

2. Background Art

Some of the present day computers handle not only numerical data but also audio or image data. The audio and image data usually carries a large amount of information to be handled. High-speed arithmetic and logic operations are, therefore, required to process such data.

FIG. 7 shows a conventional microprocessor unit including arithmetic logic units provided with flip-flops.

The shown microprocessor unit includes input circuits 1, 2, and 3, arithmetic logic units 4, 5, and 6, output circuits 7, 8, and 9, and an instruction decoding circuit 10. The input circuits 1, 2, and 3 receive input data signals each having information to be handled in synchronism with input of a first clock signal, and output them to the arithmetic logic units 4, 5, and 6, respectively, in synchronism with input of a second clock signal. The arithmetic logic units 4, 5, and 6 each perform given arithmetic and logic operations according to control signals provided by the instruction decoding circuit 10. The output circuits 7, 8, and 9 output the results of the arithmetic and logic operations performed by the arithmetic logic units 4, 5, and 6 in synchronism with input of a subsequent clock signal, respectively.

As can be seen from the drawing, the inputs to and outputs from the arithmetic logic units are one-to-one, respectively. Thus, increasing data processing speed requires increasing the frequency of the clock signals or the number of the input and output circuits and the arithmetic logic units.

The above prior art arithmetic logic unit further encounters the following drawbacks.

(1) In order to perform a plurality of arithmetic operations simultaneously, input and output circuits of a number equal to that of arithmetic logic units are needed. The output circuits output the results of the arithmetic operations according to the contents thereof, respectively. Thus, each time the results of the arithmetic operation are outputted from one of the output circuits, an output data transfer route need to be selected. This results in a complex program. Additionally, it is necessary to select one of the input circuits according to the contents of input data. This also results in a complex program.

(2) When performing a sequential operation which determines an output state based on the results of an arithmetic operation executed previously, it does not require much operation time, but takes clock periods corresponding to the number of arithmetic operations to be executed.

(3) All arithmetic operations need to be completed within constant basic clock cycles, respectively. It is, thus, difficult to increase the frequency of basic clocks. When the frequency of the basic clocks is increased to agree with a particular arithmetic operation to be completed at higher speed, it may cause a waiting time to be changed until execution of a subsequent arithmetic operation. For example, even though addition can be completed in response to a second clock signal, it may take three clock signals to complete multiplication.

(4) Simultaneous execution of a plurality of arithmetic operations requires increasing the width of an operation code because there are many combinations of the arithmetic operations, thus requiring a large capacity of a memory for program storage. Additionally, programs to be read in the microprocessor are increased, so that high-speed data transfer cannot be executed.

SUMMARY OF THE INVENTION

It is therefore a principal object of the present invention to avoid the disadvantages of the prior art.

It is another object of the present invention to provide improved architecture of a data processing system for performing a plurality of arithmetic and logic operations simultaneously or sequentially at high speed.

According to one aspect of the present invention, there is provided a data processing apparatus which comprises an instruction decoding circuit receiving operation code signals to provide first, second, and third command signals, an input circuit receiving input data to provide a plurality of data signals, a plurality of arithmetic logic circuits receiving the data signals from the input circuit, respectively, the arithmetic logic circuits being responsive to the first command signals from the instruction decoding circuit to perform arithmetic and logic operations on the received data signals and provide operation output signals indicative of results of the arithmetic and logic operations, an input selecting circuit selecting the data signals provided by the input circuit to distribute each of the data signals to corresponding one of the arithmetic logic circuits according to the second command signal from the instruction decoding circuit, an output circuit outputting the results of the arithmetic operations executed by the arithmetic logic circuit, and an output selecting circuit selecting the operation output signals provided from the arithmetic logic circuits according to the third command signal from the instruction decoding circuit to output each of the operation output signals to a given location of the output circuit.

In the preferred mode of the invention, one of the arithmetic logic circuits performs a first arithmetic and logic operation based on the data signal provided by the input circuit in synchronism with a basic clock signal having a given clock cycle, and other one of the arithmetic logic circuits performing a second arithmetic and logic operation using the results of the first arithmetic and logic operation. The output selecting circuit supplies the results of the first arithmetic and logic operation to the input selecting circuit when there is a sufficient time to complete the second arithmetic and logic operation within the given clock cycle after completion of the first arithmetic and logic operation.

A clock control circuit may be provided which is responsive to a command from the instruction decoding circuit to modify the clock cycle of the basic clock signal to a preselected length of time interval required to complete the arithmetic and logic operation to be executed in a subsequent operation executing cycle when an operation cycle of the arithmetic operation to be executed subsequently is longer than the clock cycle of the basic clock signal.

A command signal modifying means may be provided which is designed to modify the command signals outputted from the instruction decoding circuit. In practice, the command signal modifies means modifies an operation of the instruction decoding circuit specified by the same operation code signal received.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
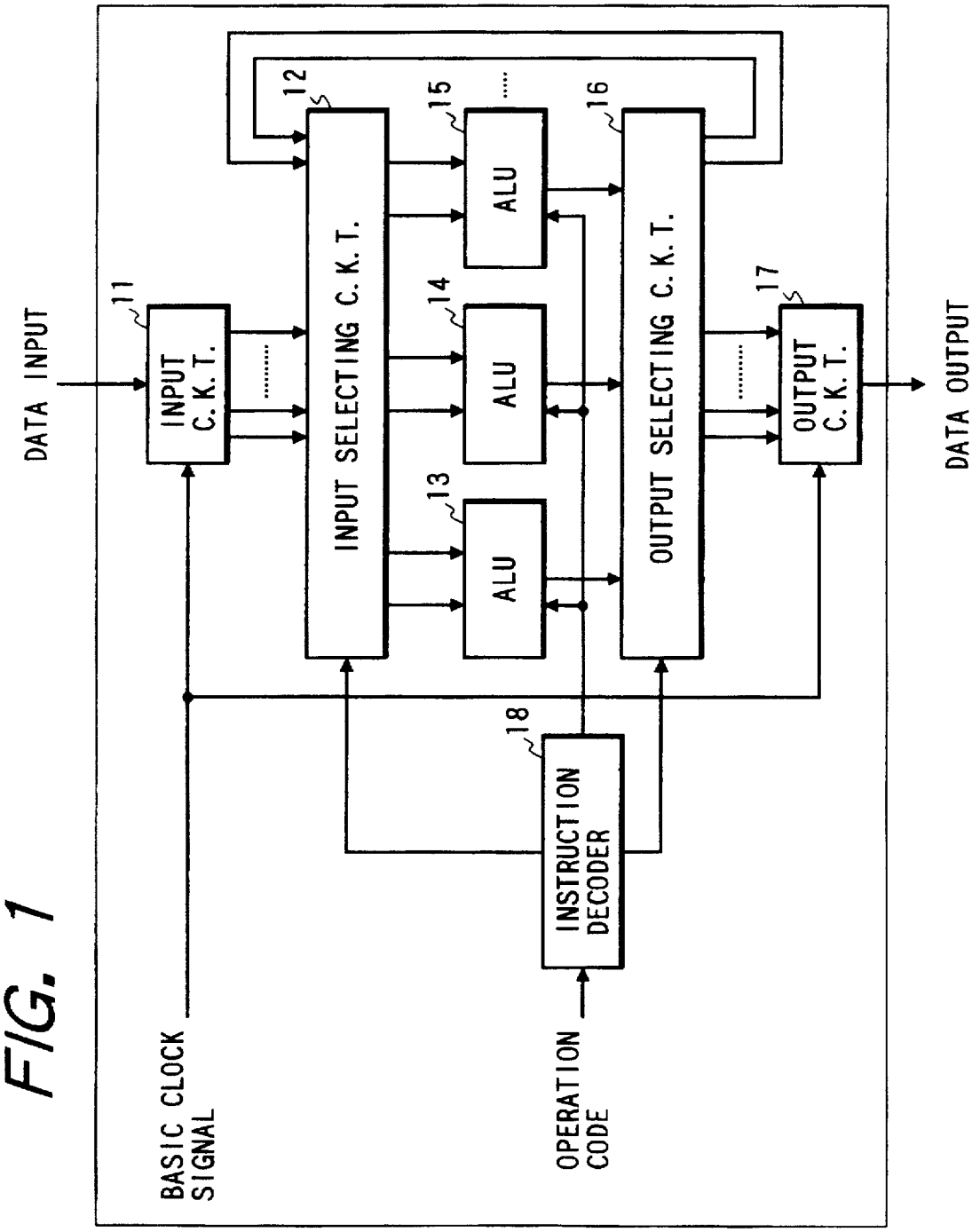
FIG. 1 is a block diagram which shows the architecture of a microprocessor according to the present invention.

Referring now to the drawings, particularly to FIG. 1, there is shown the basic architecture of a microprocessor unit according to the present invention.

The microprocessor unit generally includes an input circuit 11, an input selecting circuit 12, arithmetic logic units 13, 14, and 15, an output selecting circuit 16, an output circuit 17, and an instruction decoding circuit 18.

The input circuit 11 receives a plurality of input data signals and provides them to the input selecting circuit 12. The input selecting circuit 12 selects the input data signals from the input circuit 11 for the arithmetic logic units 13, 14, and 15, respectively. The arithmetic logic units 13, 14, and 15 perform arithmetical and logical operations on the input data signals, respectively. The output selecting circuit 16 selects the results of the arithmetic operations executed in the arithmetic logic units 13, 14, and 15 to transfer these to given locations of the output circuit 17, respectively. The output circuit 17 outputs the results of the arithmetic operation supplied from the output selecting circuit 16 in synchronism with the basic clock signals. The instruction decoding circuit 18 receives operation codes to translate them into command control signals for controlling operations of the input selecting circuit 12, the arithmetic logic units 13, 14, and 15, and the output selecting circuit 16.

The operation of the microprocessor unit, as an example, when performing a plurality of arithmetic operations simultaneously will be discussed below.

Input data signals as objects of arithmetic operations are initially inputted in series to the input circuit 11 in synchronism with a basic clock signal. The input circuit 11 at the same time changes them into parallel data signals, and outputs them to the input selecting circuit 12. The instruction decoding circuit 18 interprets a received operation code to provide a data signal distribution command signal which is, in turn, inputted to the input selecting circuit 12. The input selecting circuit 12 then distributes the input data signals from the input circuit 11 to the associated arithmetic logic units 13, 14, and 15, respectively. The arithmetic logic units 13, 14, and 15 then perform given arithmetic operations on the received input data signals according to control signals, i.e., arithmetic operation commands from the instruction decoding circuit 18, and output the results of the arithmetic operations to the output selecting circuit 16. The output selecting circuit 16 is responsive to a control signal, or command from the instruction decoding circuit 18 to transfer the inputted results of the arithmetic operations to the given locations of the output circuit 17, respectively. The output circuit 17 translates them into serial data signals which are, in turn, outputted in synchronism with a basic clock signal.

As will be appreciated from the above discussion, all inputs and outputs pass through the single input circuit 11 and the single output circuit 17, respectively. This circuit arrangement allows a plurality of arithmetic operations to be executed in parallel, i.e., simultaneously without need for input and output circuits of a number equal to that of the arithmetic logic units. Additionally, the results of arithmetic operations are outputted from the single output circuit, thereby eliminating the need for changing a data transfer route. Further, there is no need for data input to separate input circuits according to the contents of arithmetic operations, thereby facilitating easy programming.

It is to be noted that the microprocessor unit of this embodiment is also capable of performing arithmetic operations on input data, in sequence, in synchronism with the basic clock signal. Further, the input circuit 11 and the output circuit 17 may be formed with a single circuit.

Figure 2:
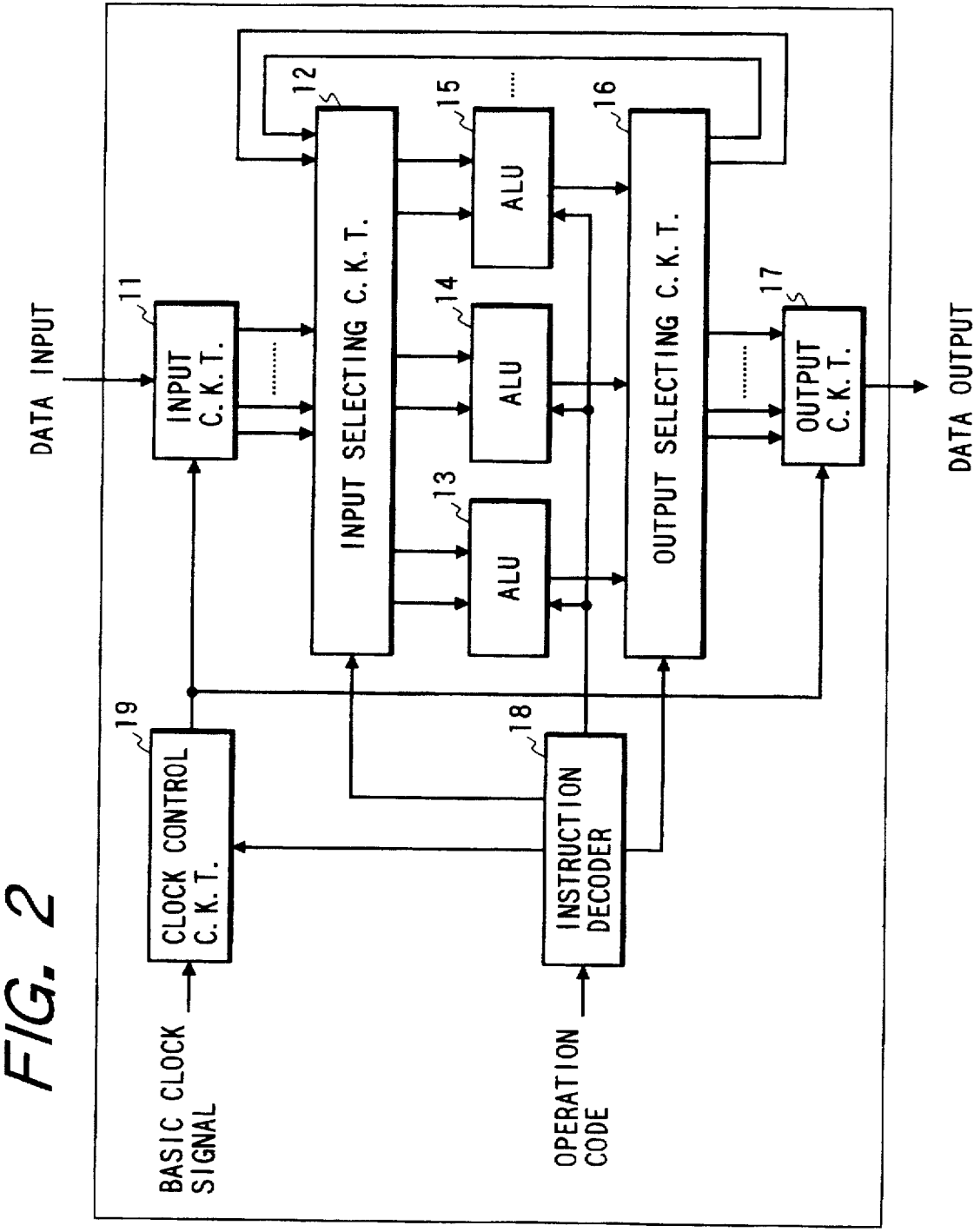
FIG. 2 is a block diagram which shows a second embodiment of a microprocessor of the invention.

Referring to FIG. 2, there is shown a second embodiment of the microprocessor unit of the invention.

The shown microprocessor unit is different in circuit arrangement from the above first embodiment only in that a clock control circuit 19 is provided which generates clock signals at intervals suitable for execution of arithmetic operations according to a control signal from the instruction decoding circuit 18. Other arrangements are substantially the same as those of the first embodiment and explanation thereof in detail will be omitted here.

The operation of the microprocessor unit of this embodiment will be described below which carries out a sequential operation to determine an output state based on a previous state of input.

Figure 3A:
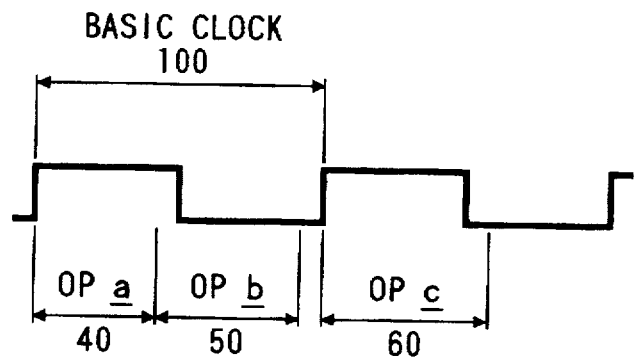
FIG. 3(a) is a time chart which shows execution timing of arithmetic operations.

It is assumed that basic clock signals, as shown in FIG. 3(a), are produced at a clocking rate, or frequency of 100, and arithmetic operations a, b, and c are carried out, in sequence, at operation cycles of 40, 50, and 60.

Figure 3B:
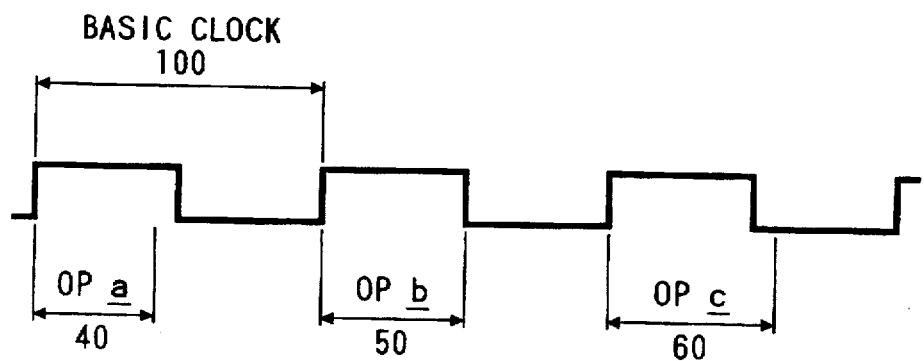
FIG. 3(b) is a time chart which shows execution timing of arithmetic operations in a conventional microprocessor.

Initially, data for the arithmetic operation a is inputted to the input circuit 11 in response to the basic clock signal. The input selecting circuit 12 is responsive to a control signal from the instruction decoding circuit 18 to output the received data to the arithmetic logic unit 13. The arithmetic circuit 13 then performs the arithmetic operation a, and supplies the results thereof back to the output selecting circuit 16. The output selecting circuit 16 returns the results of the arithmetic operation a to the input selecting circuit 12. The input selecting circuit 12 then outputs the results of the arithmetic operation a to the arithmetic logic unit 14. The arithmetic logic unit 14 executes the arithmetic operation b using the results of the arithmetic operation a, and outputs the results thereof to the output selecting circuit 16. The time elapsed until completion of the arithmetic operations a and b is a period of time of 90, so that the third arithmetic operation c cannot be completed within the first clock cycle of 100. Thus, the output selecting circuit 16 then supplies the results of the arithmetic operation b to the output circuit 17 without returning them to the input selecting circuit 12. The output circuit 17 transfers the results of the arithmetic operation b to the input circuit 11 in synchronism with input of the basic clock signal. The results of the arithmetic operation b are then supplied to the arithmetic logic unit 15 through the input selecting circuit 12. The arithmetic logic unit 15 performs the arithmetic operation c using the input data, and provides the results thereof to the output selecting circuit 16. The output selecting circuit 16 then transfers them to the output circuit 17 which are, in turn, outputted in response to a subsequent clock signal. The instructions to control operations of the logical elements are given by the instruction decoding circuit 18 and the execution order of the arithmetic operations are also determined by the instruction decoding circuit 18. The sequence of the arithmetic operations a, b, and c is, as can be seen in FIG. 3(a), completed within a period of time of 150 using the two clock signals. In contrast to this, a conventional microprocessor unit, as shown in FIG. 3(b), performs arithmetic operations, one in response to each clock signal. Thus, for example, completing the three arithmetic operations a, b, and c takes three clock signals.

Usually, clock signals for controlling arithmetic operations such as those discussed above are timed to one of the arithmetic operations taking the longest operation time. If, however, such operation time is too long, the completion of all arithmetic operations will be delayed. Thus, it is desirable to make an exception of an arithmetic operation requiring much operation time.

Figure 4A:
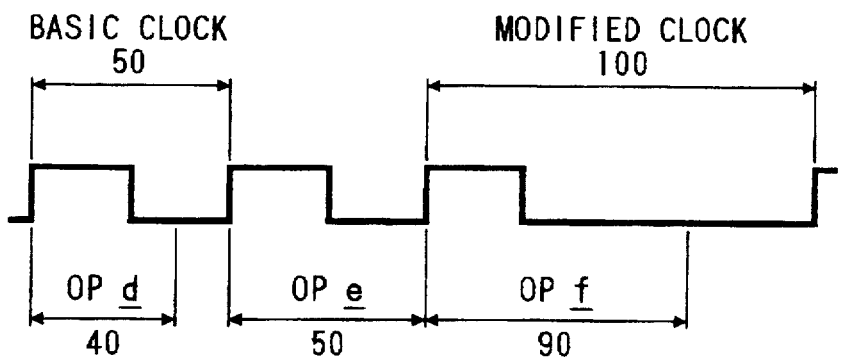
FIG. 4(a) is a time chart which shows execution timing of arithmetic operations in a microprocessor of a second embodiment.

FIG. 4(a) shows a modification of the microprocessor unit of the second embodiment.

In this modification, it is assumed that basic clock signals are so generated as to have a clock period of 50, and arithmetic operations d, e, and f are carried out, in sequence, at operation cycles of 40, 50, and 90.

Initially, data for the arithmetic operation d is inputted to the input circuit 11 in response to the first basic clock signal. The input selecting circuit 12 is responsive to a control signal from the instruction decoding circuit 18 to output the received data to the arithmetic logic unit 13. The arithmetic circuit 13 then performs the arithmetic operation d, and outputs the results thereof to the output selecting circuit 16. The output selecting circuit 16 outputs the received results of the arithmetic operation d to the output circuit 17. The output circuit 17 then transfers them in synchronism with the basic clock signal to the input circuit 17. The input circuit 17 supplies the output from the input circuit 17 to the arithmetic logic unit 14. The arithmetic logic unit 14 then executes the arithmetic operation e using the results of the arithmetic operation d, and outputs the results thereof to the output selecting circuit 16. The output selecting circuit 16, as similar to the previous cycle, outputs the results of the arithmetic operation e through the output circuit 17 in synchronism with a subsequent clock signal. The output of the output circuit 17 is returned again to the input circuit 11. Upon completion of the arithmetic operation e, the instruction decoding circuit 18 provides a control signal to the clock control circuit 17. The clock control circuit 17 then temporarily modifies the clock period to a cycle 100, and outputs a modified clock signal to the input circuit 11 and the output circuit 17.

Figure 4B:
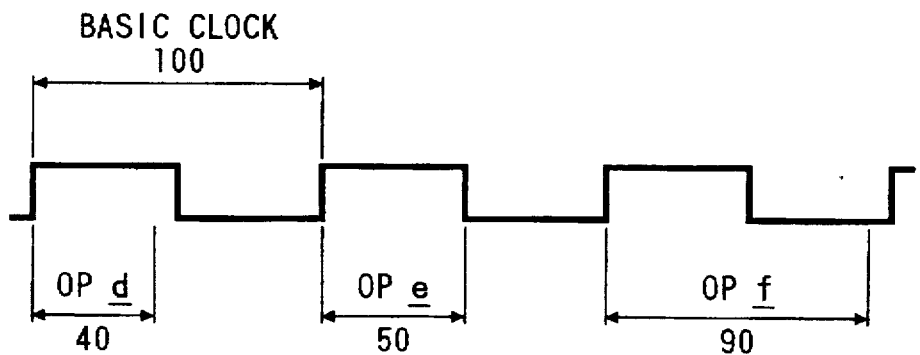
FIGS. 4(b) and 4(c) are time charts which show execution timing of arithmetic operations in a conventional microprocessor.
Figure 4C:
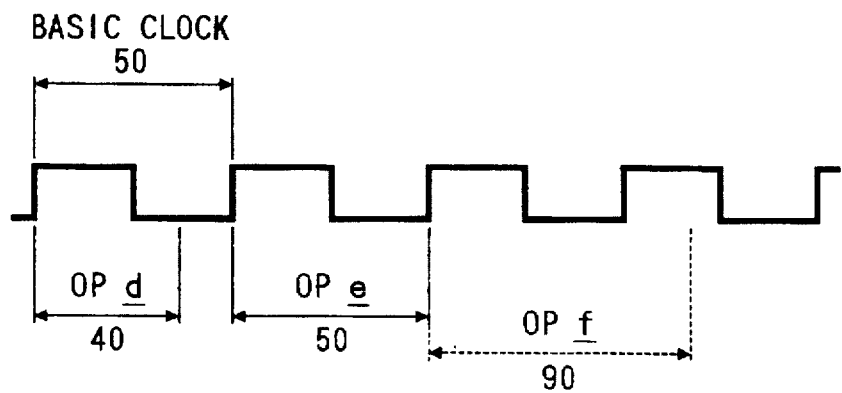

The results of the arithmetic operation e inputted to the input circuit 17 is then supplied to the arithmetic logic unit 15 through the input selecting circuit 12 in synchronism with the modified clock signal. The arithmetic logic unit 15 performs the arithmetic operation f on the results of the arithmetic operation e. The results of the arithmetic operation f are outputted from the output circuit 17 through the output selecting circuit 16 in response to a subsequent clock signal. The arithmetic logic unit of this embodiment takes a total operation time of 190, to complete the sequence of the arithmetic operations d, e, and f, which is shorter than four clock periods of the basic clock signal having the clock cycle of 50 as well as two clock periods of the modified clock signal having the clock cycle of 100. In contrast to this, a conventional microprocessor unit, as shown in FIG. 4(b), must set clock periods of clock signals to a constant cycle 100 enough to execute the arithmetic operation f having the longest operation cycle of 90, taking three of the clock signals to complete all the three arithmetic operations d, e, and f. Additionally, another example of a conventional microprocessor unit is shown in FIG. 4(c) wherein clock periods of clock signals are set to a cycle of 50 which is shorter than the operation time required to complete the arithmetic operation f. In this case, only the arithmetic operation f needs to be performed in another arithmetic logic unit through separate input and output circuits. After a predetermined operation time is elapsed, the results of the arithmetic operation f is looked up. This type of operation allows the results of the arithmetic operation e to be looked up when a subsequent clock signal following the execution of the arithmetic operation e is inputted, but the arithmetic operation f cannot be looked up until a period of time corresponding to one cycle of the clock signals is further elapsed. This is quite inconvenience to define instructions or a program for arithmetic operations.

Figure 5A:
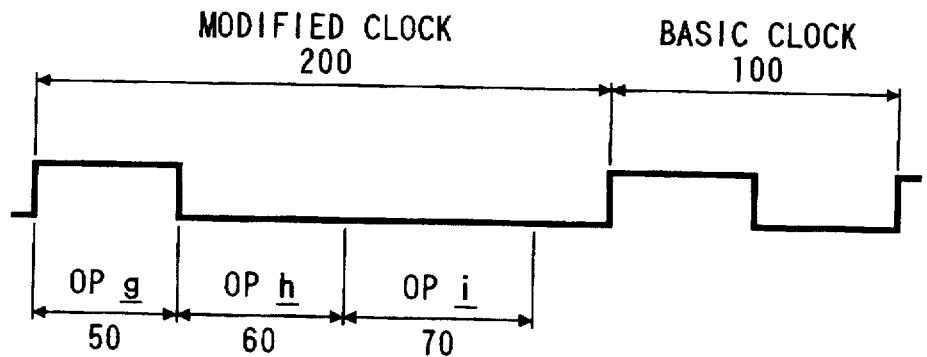
FIG. 5(a) is a time chart which shows execution timing of arithmetic operations having operation cycles different from those shown in FIG. 4(a) in a microprocessor of a second embodiment.

Another example of the operation of the microprocessor unit of the invention will be described below with reference to FIG. 5(a). In the following example, it is assumed that basic clock signals are generated at a frequency of 100, and arithmetic operations g, h, and i are carried out, in sequence, at operation cycles of 50, 60, and 70.

Figure 5B:
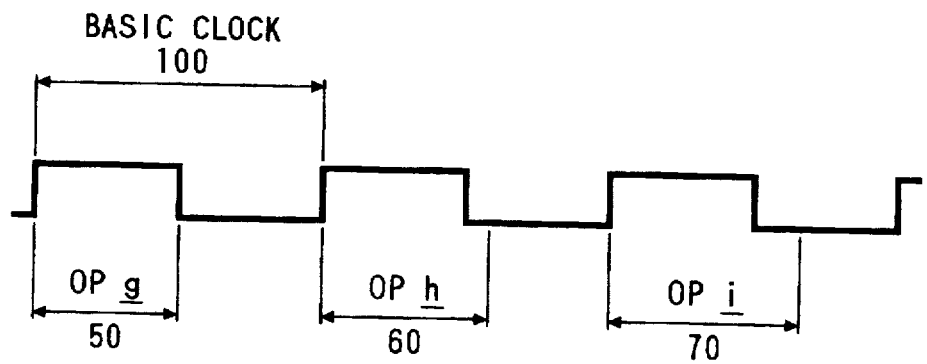
FIG. 5(b) is a time chart which shows execution timing of arithmetic operations having the same operation cycles as those shown in FIG. 5(a) in a conventional microprocessor.

As will be appreciated from the drawings, a conventional microprocessor unit, as shown in FIG. 5(b), takes three basic clock signals having a frequency of 100 to complete all the arithmetic operations g, h, and i, while the microprocessor unit of the invention controls the clock control circuit 19 through the instruction decoding circuit 18 to temporarily change the frequency of the clock signals to a cycle 200, thereby allowing all the arithmetic operations to be completed within a period of time corresponding to two of the basic clock signals having the frequency of 100.

In operation, data on the arithmetic operation g is initially inputted to the input circuit 11 in synchronism with input of the clock signal whose frequency is modified to a cycle 200. The input circuit 11 supplies it to the arithmetic logic unit 13 through the input selecting circuit 12. The arithmetic circuit 13 performs the arithmetic operation g and outputs the results thereof to the output selecting circuit 16. The output selecting circuit 16 returns the results of the arithmetic operation g back to the input selecting circuit 12. The input selecting circuit 12 then transfers them to the arithmetic logic unit 14 wherein the arithmetic operation h on the results of the arithmetic operation g is carried out. The results of the arithmetic operation h are then inputted to the output selecting circuit 16. The output selecting circuit 16 further returns them back to the input selecting circuit 12, which is, in turn, inputted to the arithmetic logic unit 15. The arithmetic logic unit 15 then performs the arithmetic operation i using the results of the arithmetic operation h, and outputs the results thereof to the output selecting circuit 16. The output selecting circuit 16 then transfers the results of the arithmetic operation h to the output circuit 17 wherein the received results are outputted in synchronism with input of a subsequent clock signal.

Figure 6:
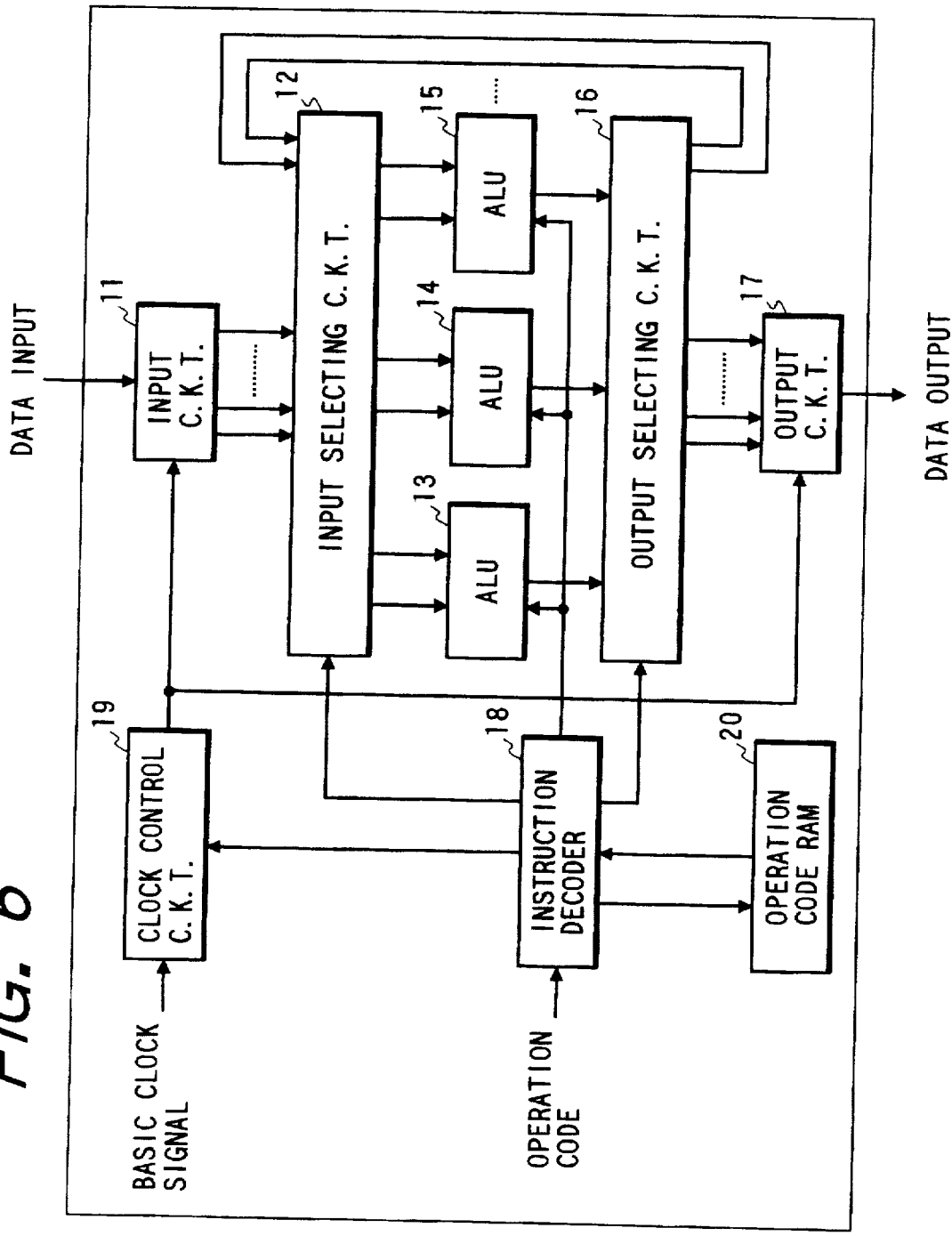
FIG. 6 is a block diagram which shows a third embodiment of a microprocessor of the invention.
Figure 7:
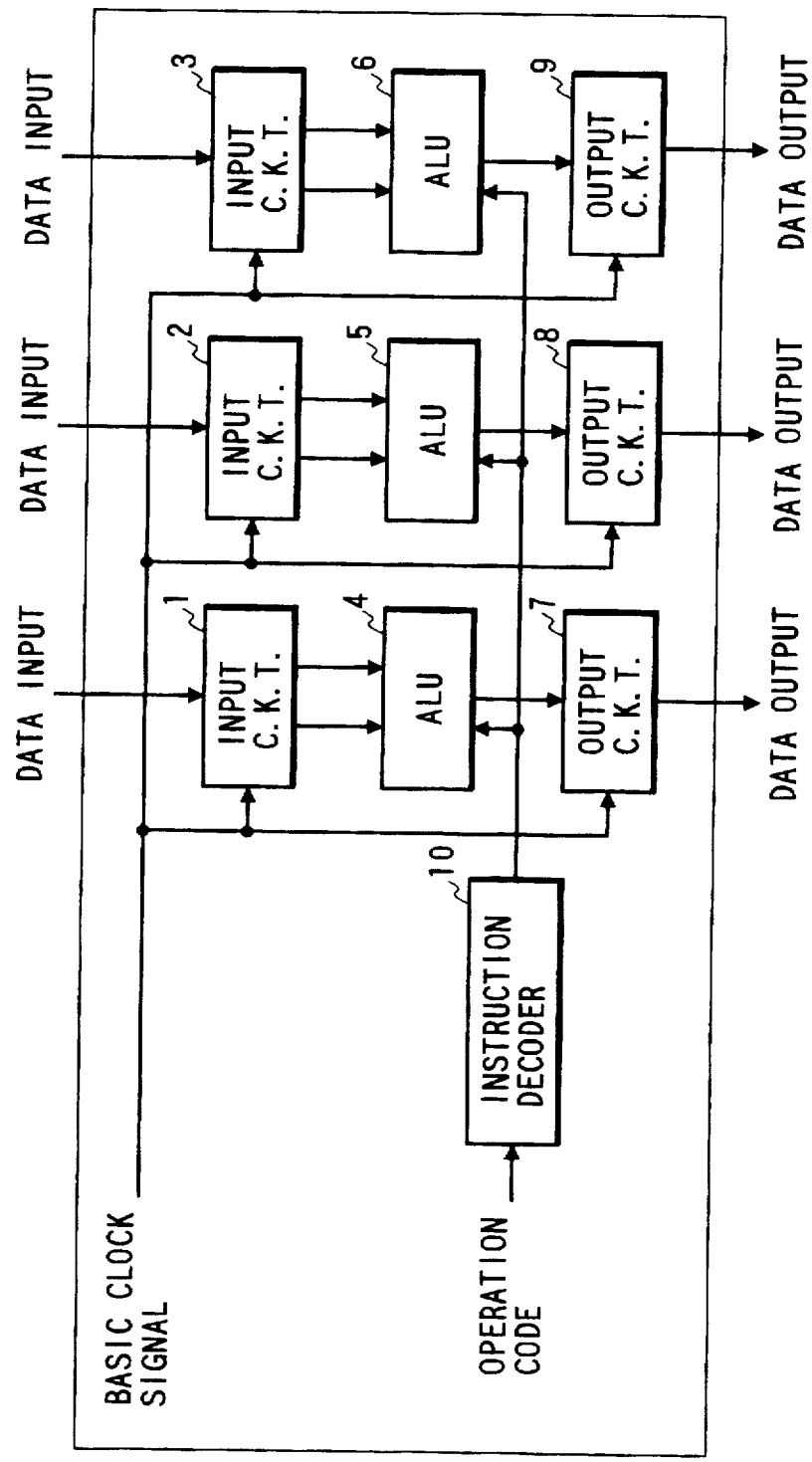
FIG. 7 is a block diagram which shows a conventional microprocessor.

Referring to FIG. 6, there is shown a third embodiment of the microprocessor unit of the invention.

The shown microprocessor unit is different in circuit arrangement from the above second embodiment only in that an operation code RAM 20 is provided. Other arrangements are substantially the same as those of the second embodiment and explanation thereof in detail will be omitted here.

Generally, when a large number of arithmetic logic units are used, there would be many combinations of the arithmetic logic units which are enabled simultaneously. In such a case, a conventional arithmetic logic unit designed to decode instructions in fixed manners requires the same number of operation codes as that of arithmetic logic units. This results in increased width of operation codes. The decrease in code width may be accomplished by limiting combinations of arithmetic operations, but it becomes ineffective to utilize hardware. For a typical application, it is known that not all of combinations of arithmetic operations are always used.

Accordingly, this embodiment employs the operation code RAM 20 from which the instruction decoding circuit 18 can retrieve information for changing a logical operation of the instruction decoding circuit 18 specified by the same operation code. The operation code RAM 20 stores instructions which designate necessary combinations of arithmetic operations selected from all possible combinations. This achieves effective programming.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, more than three arithmetic logic units may be utilized. Additionally, the frequency of clock signals may be changed to multiples such as two times, three times, or four times a basic frequency.

What is claimed is:

1. A data processing apparatus comprising:

an instruction decoding circuit receiving operation code signals to provide first, second, and third command signals;

an input circuit receiving input data to provide a plurality of data signals;

a plurality of arithmetic logic circuits receiving the data signals from said input circuit, respectively, said arithmetic logic circuits being responsive to the first command signals from said instruction decoding circuit to perform arithmetic and logic operations on the received data signals and to provide operation output signals indicative of results of the arithmetic and logic operations;

an input selecting circuit selecting the data signals provided by said input circuit to distribute each of the data signals to a corresponding one of said arithmetic logic circuits according to the second command signal from said instruction decoding circuit;

an output circuit outputting the results of the arithmetic operations executed by said arithmetic logic circuit; and an output selecting circuit selecting the operation output signals provided from said arithmetic logic circuits according to the third command signal from said instruction decoding circuit to output each of the operation output signals to a given location of said output circuit, wherein one of said arithmetic logic circuits performs a first arithmetic and logic operation based on the data signal provided by said input circuit in synchronism with a basic clock signal having a given clock cycle, another of said arithmetic logic circuits performing a second arithmetic and logic operation using the results of the first arithmetic and logic operation, said output selecting circuit supplying the results of the first arithmetic and logic operation to said input selecting circuit for use in the second arithmetic and logic operation when there is a sufficient time to complete the second arithmetic and logic operation within the given clock cycle after completion of the first arithmetic and logic operation.

2. A data processing apparatus as set forth in claim 1, further comprising a clock control circuit which is responsive to a command from said instruction decoding circuit to modify the clock cycle of the basic clock signal to a preselected length of time interval required to complete the arithmetic and logic operation to be executed in a subsequent operation executing cycle when an operation cycle of the arithmetic operation to be executed subsequently is longer than the clock cycle of the basic clock signal.

3. A data processing apparatus as set forth in claim 1, further comprising command signal modifying means for modifying the command signals outputted from said instruction decoding circuit.

4. A data processing apparatus as set forth in claim 3, wherein said command signal modifying means modifies an operation of said instruction decoding circuit specified by the same operation code signal received.

5. A data processing apparatus comprising:

an instruction decoding circuit receiving operation code signals to provide first, second, and third command signals;

an input circuit receiving input data to provide at least first and second data signals;

at least first and second arithmetic logic circuits performing first and second arithmetic and logic operations on the first and second data signals outputted from said input circuit according to the first command signals, respectively, said first arithmetic logic circuit performing the first arithmetic and logic operation in synchronism with input of one of a series of basic clock signals produced at a given clock cycle to provide a first operation output signal indicative of a result of the first arithmetic and logic operation, said second arithmetic logic circuit performing the second arithmetic and logic operation using the result of the first arithmetic and logic operation;

an input selecting circuit distributing the first and second data signals to said first and second arithmetic logic circuits, respectively, according to the second command signal from said instruction decoding circuit;

an output circuit outputting the results of the first and second arithmetic operations executed by said first and second arithmetic logic circuit; and an output selecting circuit distributing the first and second operation output signals provided from said first and second arithmetic logic circuits to given locations of said output circuit, respectively, according to the third command signal from said instruction decoding circuit.

6. A data processing apparatus as set forth in claim 5, wherein said output selecting circuit supplies the result of the first arithmetic and logic operation to said input selecting circuit for use in the second arithmetic and logic operation when there is a sufficient time to complete the second arithmetic and logic operation within the given clock cycle of the one of the series of basic clock signals after completion of the first arithmetic and logic operation.

7. A data processing apparatus as set forth in claim 6, further comprising a clock control circuit which is responsive to a command from said instruction decoding circuit to modify the clock cycle of a second one of the series of basic clock signals to a preselected length of time interval required to complete the second arithmetic and logic operation to be executed by said second arithmetic logic circuit in a subsequent operation executing cycle when an operation cycle of the second arithmetic operation is longer than the clock cycle of the basic clock signals.

* * * * *